United States Patent [15] 3,706,425

Deguchi et al. [45] Dec. 19, 1972

[54] AUTOMATIC TAPE LOADING TYPE MAGNETIC RECORDING AND REPRODUCING APPARATUS

[72] Inventors: Masahiro Deguchi, Higashi-Osaka; Masaru Hashirano, Moriguchi, both of Japan

[73] Assignee: Matsushita Electric Industrial Co., Ltd., Osaka, Japan

[22] Filed: July 6, 1971

[21] Appl. No.: 160,035

[30] Foreign Application Priority Data

July 8, 1970 Japan ....................45/60419

[52] U.S. Cl. ....................242/195, 226/91

[51] Int. Cl. ....................G03b 1/04, G11b 15/32

[58] Field of Search ....................242/188–190, 195; 226/91, 92

[56] References Cited

UNITED STATES PATENTS 3,127,120 3/1964 Selsted et al. ....................242/188
3,153,516 10/1964 De Loof et al. ....................242/188
3,630,468 12/1971 Christoffersen et al. ....................242/195

*Primary Examiner*—Leonard D. Christian
*Attorney*—Stevens, Davis, Miller & Mosher

[57] ABSTRACT

An automatic tape loading type magnetic recording and reproducing apparatus of the kind employing a leader tape of a predetermined length which is spliced to the forward end of a magnetic tape so that the leader tape is first guided along a predetermined path when the magnetic tape is to be loaded and when loading the magnetic tape, the leader tape is fed at a speed faster than the normal tape speed so that when the magnetic tape following the leader tape is placed in its correct predetermined path, its running speed is automatically switched from the said faster speed to the normal tape speed to thereby reduce the tape loading time.

3 Claims, 4 Drawing Figures

AUTOMATIC TAPE LOADING TYPE MAGNETIC RECORDING AND REPRODUCING APPARATUS

The present invention relates to magnetic recording and reproducing apparatus of the type which employs an automatic magnetic tape loading mechanism.

An object of the present invention is to provide a tape transport mechanism which is capable of reducing the automatic tape loading time and is stable in operation.

The above and other objects and advantages of the present invention will be readily apparent from the following detailed description of an embodiment of the invention taken in conjunction with the accompanying drawings, in which.

Figure 1:
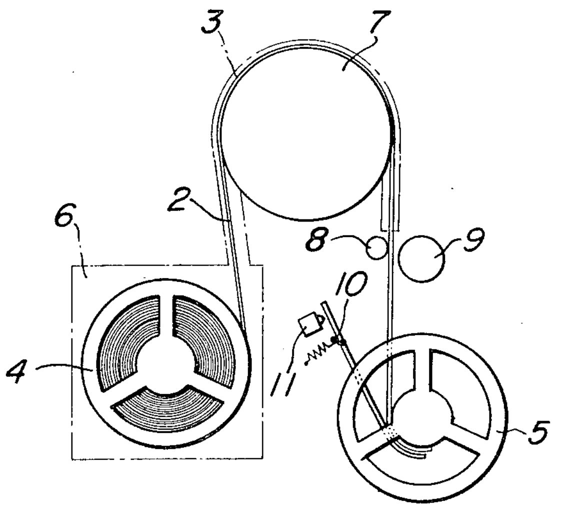
FIG. 1 is a plan view showing an embodiment of the present invention.
Figure 2:
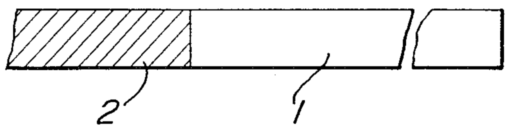
FIG. 2 is a plan view showing, by way of example, a tape used with the embodiment of FIG. 1.

Referring now to the drawings, numeral 1 designates a leader tape adapted to take a magnetic tape 2 from a supply reel 4 and a reel case 6 so that the magnetic tape 2 is slidably led into a guide member 3 so as to be mounted on a guide cylinder 7, the leader tape being made of a relatively tough material. Disposed within the guide cylinder 7 are rotary magnetic heads (not shown) which traversely record video signals on the magnetic tape 2 and play back the recorded video signals. The rotary heads rotate such that the magnetic tape 2 is run in intimate contact with the head gaps, but the leader tape 1 of a relatively tough material will never contact physically with the heads. Numeral 8 designates a capstan for causing the tape to run, 9 a pinch roller adapted to cooperate with the capstan 8 to move the tape, 5 a take-up roll. Although not shown in the drawings, there are further provided feeding and rewinding idlers for driving the supply reel 4, take-up and fast forward idlers for driving the take-up reel 5 and a stop lever for stopping the rotation of the two reels.

Figure 3:
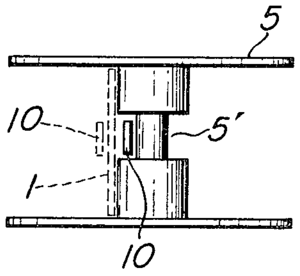
FIG. 3 is a fragmental side view of the embodiment of FIG. 1.

In the first place, the operation of a device of the above type which is known in the art will be described briefly. At the same time that a play switch is turned on a stop lever for stopping the rotation of the reels is released to disengage the brakes for the reels. Concurrently, a feeding idler is urged against the shaft of a supply reel 4 and a take-up idler is urged against the shaft of a take-up reel 5 and the idlers are driven to press a pinch roller 9 against a capstan 8. In this state, the tape is fed such that a leader tape 1 is first let out from a case 6 and is run through a guide member 3 and between the rotating capstan 8 and the pinch roller 9 so as to be taken up on a take-up reel 5. At the instant that the take-up reel 5 starts to take up the leader tape 1, a rotatable loading detecting lever 10 having one end urged into a slot 5' formed in the spool portion of the take-up reel 5 as shown in FIG. 3 is moved in the direction shown by an arrow in FIG. 1 its said end is removed out of the slot 5' by the leader tape being taken up. When this happens, a microswitch 11 associated with the loading detecting lever 10 is changed from its on-state to off-state so that the feeding idler driving the supply reel 4 is disengaged with the shaft of the supply reel and thus the transport mechanism returns to the normal play mode of operation. In this case, however, the normal record and playback modes of operation are permitted only after the tape has moved past the capstan 8.

In the case of the operation described above, after the arrival of the forward end of the leader tape 1 at the capstan 8, the leader tape will be moved at a tape speed as determined by the capstan 8. Thus, if the speed at which the tape is fed is faster than the tape speed determined by the capstan, a slack will result in the leader tape thereby making it impossible to effect the required loading of the tape. This means that the leader tape must be let out at a speed below the normal tape speed and that this fact will in turn cause inconvenience to the magnetic video recording and reproducing systems employing slow tape speeds, since a considerable time will be required for loading the tape in such systems. In other words, the leader tape must have a minimum length extending from the outlet of the case 6 to the capstan shaft and the apparatus itself cannot be entered into the recording or reproducing operation until the terminal end of the leader tape passes through the capstan.

The present invention contemplates principally solving the aforesaid deficiencies of the conventional apparatus. The present invention will now be explained in detail hereunder.

Figure 4:
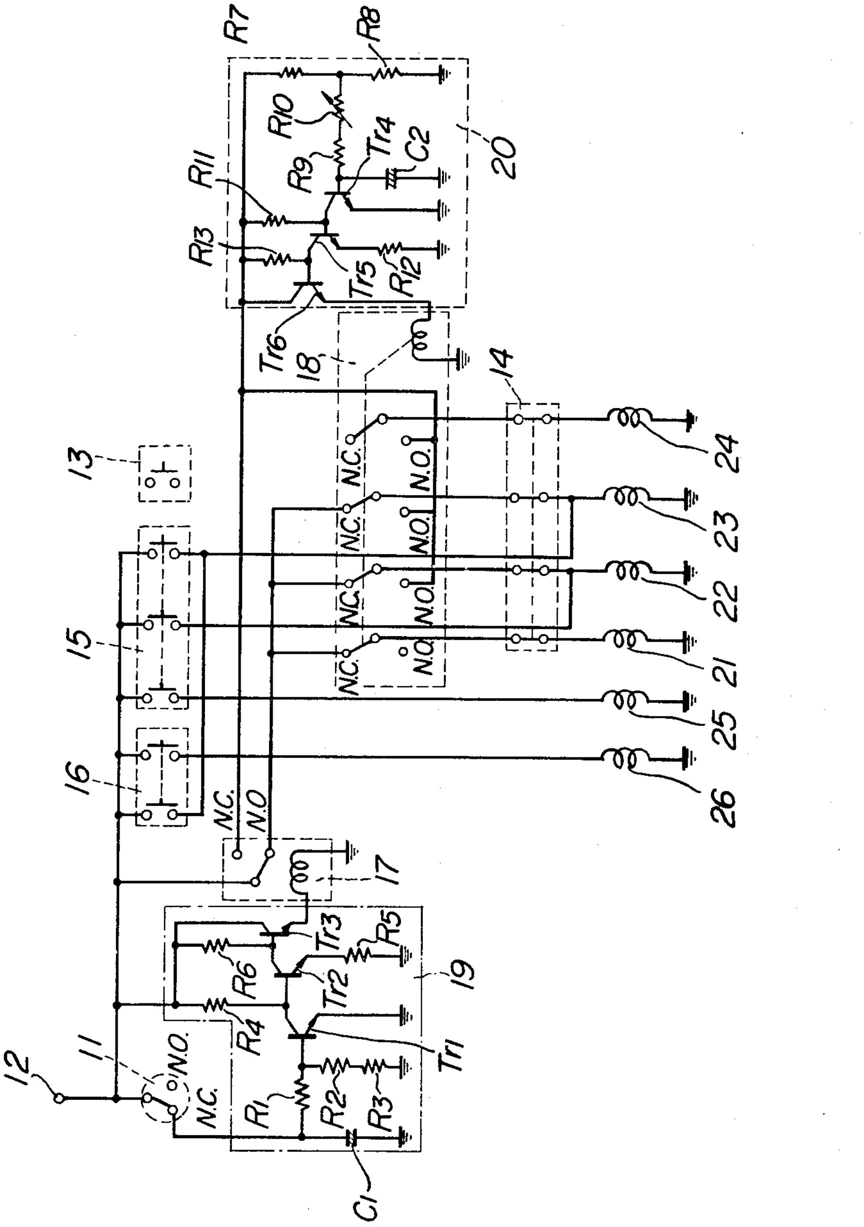
FIG. 4 is an electrical wiring diagram of the embodiment of FIG. 1.

Referring now to FIG. 4 illustrating, by way of example, a circuit diagram of the apparatus of the present invention which is useful for explaining the invention, numeral 11 designates a microswitch for detecting the loading condition in FIG. 1 with its terminal 12 being adapted to receive a constant DC voltage. Numerals 13, 14, 15 and 16 designate respectively stop, play, fast forward (FF) and rewind (REW) switches which are designed such that not more than two switches will be turned on at a time, and the switches 14, 15 and 16 will be returned to the off-state when the switch 13 is actuated. Numerals 17 and 18 designate electromagnetic relays designed such that the contacts are shifted to N.C positions when there is no current flow to the relay coils, while the contacts are thrown to N.O positions when current is supplied to the relay coils. Numerals 19 and 20 designate delay circuits each thereof having a proper delay time, 21, 22, 23, 24, 25 and 26 a feed solenoid, take-up solenoid, brake solenoid, pinch roller solenoid, fast forward solenoid and rewind solenoid, respectively, which operate in the following manner according to the various modes of operation of the apparatus:

| Solenoid | 21 | 22 | 23 | 24 | 25 | 26 |
|---|---|---|---|---|---|---|
| Stop | OFF | OFF | OFF | OFF | OFF | OFF |
| Start loading | ON | ON | ON | OFF | OFF | OFF |
| Start play mode | OFF | ON | ON | ON | OFF | OFF |
| FF | OFF | ON | ON | OFF | ON | OFF |
| REW | OFF | OFF | ON | OFF | OFF | ON |

where ON = solenoid energized by the current flow to the coil; OFF = solenoid de-energized with no current flow to the coil. The solenoids 21, 22, 24, 25 and 26 are designed such that the idlers are urged against the respective shafts to effect the required functions only when these solenoids are turned on, while the brake mechanism is urged against the reel shafts to stop the rotation of the reel shafts only when the solenoid 23 is in the off-state. The delay circuits 19 and 20 are of the type which utilizes the charging and discharging of a capacitor. In FIG. 4, $C_1$ and $C_2$ are charging and discharging capacitors; $R_1$ and $R_9 + R_{10}$, base input resistors of transistors $T_{r1}$ and $T_{r4}$, respectively; $R_7$ and $R_8$, voltage dividing resistors for determining the voltage across the capacitor; $R_1$, $R_2$ and $R_3$, base biasing resistors for the transistor $T_{r1}$ and at the same time elements for determining the discharging time constant with the capacitor $C_1$. The resistors $R_9$, $R_{10}$ and $R_8$ determine the discharging time constant for the capacitor $C_2$, and the time constants for charging the capacitors $C_1$ and $C_2$ depend on the power supply impedance and $R_9 + R_{10}$, respectively. $R_4$, $R_6$, $R_{11}$ and $R_{13}$ designate the collector resistors of the transistors $T_{r1}$, $T_{r2}$, $T_{r4}$ and $T_{r5}$, respectively; $R_5$ and $R_{12}$, emitter resistors for the transistors $T_{r2}$ and $T_{r5}$, respectively.

Next, the operation of the circuit shown in FIG. 4 will be explained. FIG. 4 illustrates the conditions in the start mode of operation of the apparatus. In other words, a play switch 14 is already depressed and hence the microswitch 11 is also thrown to the N.C position and the capacitor $C_1$ is being charged since the power supply has been switched on so that the transistor $T_{r1}$ is on, $T_{r2}$ is off and $T_{r3}$ is on and the coil of the relay 17 is energized to throw its switch contact to the N.O position. On the other hand, with no current supplied to the delay circuit 20 the switch contacts of the relay 18 are all thrown to the N.C positions and hence the solenoids 21, 22 and 23 are also energized so that the brakes are off and the leader tape is fed at a faster speed. In this state, the leader tape will slidably move along the guide member 3 so that the leader tape thus wound on the guide cylinder 7 is taken up by the take-up reel 5. When the leader tape 1 starts to accumulate on the take-up reel 5, the loading detecting lever 10 is moved so that the contact of the microswitch 11 is thrown to the N.O position and the capacitor $C_1$ in the delay circuit 19 starts discharging. Thus, the potential at the base of the transistor $T_{r1}$ eventually reaches a level where the transistor $T_{r1}$ is turned off with the transistor $T_{r2}$ on and $T_{r3}$ off with the result that the switch contact of the relay 17 is changed to the N.C position and a circuit is established between the delay circuit 20 and the power source.

At the instant that the relay 17 is changed to the N.C position, the solenoids 21, 22 and 23 are turned off. In other words, the stop condition is accomplished. The delay time or the transistor $T_{r1}$ of the delay circuit 19 may be advantageously selected such that the transistor $T_{r1}$ is turned off at least after the leader tape has moved past the capstan 8 and the pinch roller 9 upon actuation of the microswitch 11. The purpose of providing the stop condition is to prevent the tape from being slackened during the transition from the high tape speed for the loading mode of operation to the low tape speed for the play mode, and thus this stop condition is momentary in nature and is not always required. On the other hands, the capacitor $C_2$ starts to charge upon the establishment of a circuit between the delay circuit 20 and the power source. Then, as the voltage at the base of the transistor $T_{r4}$ becomes higher than a certain value so that the transistor $T_{r4}$ is turned on, the transistor $T_{r5}$ is turned off and the transistor $T_{r6}$ is turned on and hence the coil of the relay 18 is energized. When this happens, the switch contacts of the relay 18 are changed to the N.O positions and the solenoids 22, 23 and 24 are turned on with the result that the brakes are released and the solenoid 24 urges the pinch roller 9 against the capstan 8 to advance the magnetic tape, while the solenoid 22 actuates the take-up reel 5 to take up the tape thereon. Whereupon, the supply reel is released.

It will be now apparent from the foregoing description that the stop condition is dependent upon the delay times provided by the delay circuits 19 and 20. It will also be apparent that since the leader tape is fed independent of the capstan 8 when the magnetic tape is to be loaded, the time required for loading the magnetic tape can be reduced to the maximum possible extent as compared with the conventional apparatus wherein during the start and the loading operations the tape is moved at the same tape speed as designed for the normal play mode of operation.

While the circuit construction of FIG. 4 has been chiefly described by way of example, it is self-evident that the same effect can be achieved by other forms of the arrangement of the component elements.

The stop, fast forward and rewinding modes of operation are similar with those employed in the conventional apparatus. Furthermore, while the loading detecting method has been described which employs the detecting lever 10 for detecting the taking up of the leader tape 1 on the take-up reel 5 and the microswitch 11 operatively associated with the detecting lever 10, any other methods such as one in which a photocell and a light source are employed to detect the forward end or the terminal end of a leader tape or a conductive substance is attached to the leader tape so that the required detection is provided by the conduction of the leader tape when it moves past the detecting post, can be equally used as a matter of course.

Further, it should be apparent that the present invention has advantages in that since the microswitch 11 is in the N.O position and the relay 17 is also in the N.C position when the tape is already loaded, the depression of the play switch almost instantaneously throws the relay 18 to the N.O position so that the normal record or reproduction mode of operation can be obtained without delay.

In conclusion, it is seen that according to the system of the present invention the pinch roller is not urged against the capstan when the magnetic tape is to be loaded, and thus the leader tape can be fed and taken up at a faster speed on the take-up reel thereby reducing the tape loading time considerably. It is also seen that the present invention has a considerable practical utility in that since it is not necessarily essential to detect the passage of the terminal end of the leader tape past the capstan so as to detect the loading of the magnetic tape, the loading of the magnetic tape can be effectively detected at any given location along the path of the tape at any given time, thereby making it possible to employ a wide range of detecting methods.

What is claimed is:

1. An automatic loading type magnetic recording and reproducing apparatus comprising: a supply reel on which is wound a magnetic tape having a leader tape spliced to the forward end thereof; tape feed means engaged with said supply reel for taking said leader tape from said supply reel to feed said leader tape along a predetermined path at a speed faster than the tape speed used in the recording or playback mode of operation; take-up means for engaging with the forward end of said leader tape fed through said predetermined path to successively take up said leader tape and said succeeding magnetic tape on said take-up means; tape driving means disposed in said path to move, when required, said magnetic tape at the tape speed used in the recording or playback mode; detecting means for detecting the engagement of said leader tape with said take-up means; means responsive to the actuation of said detecting means to stop the action of said tape feed means with a predetermined time delay; and means responsive to the actuation of said detecting means to actuate said tape driving means after the action of said tape feed means has been stopped, or at the same time.

2. The apparatus according to claim 1, wherein said delay time introduced between the actuation of said detecting means and the termination of the action of said tape feed means is selected to be the time interval required for said leader tape to move past said tape driving means after the actuation of said detecting means.

3. An automatic loading type magnetic recording and reproducing apparatus comprising: a supply reel on which is wound a magnetic tape having a leader tape spliced to the forward end thereof; tape feed means engaged with said supply reel for taking said leader tape from said supply reel to feed said leader tape along a predetermined path at a speed faster than the tape speed used in the recording or playback mode of operation; take-up means for engaging with the forward end of said leader tape fed through said predetermined path to take up said leader tape and said succeeding magnetic tape on said take-up means; tape driving means disposed in said predetermined path to move, when required, said magnetic tape at the tape speed used in the recording or playback mode; a switch (11) for detecting the engagement of said leader tape with said take-up means to open the contacts; a first delay circuit (19) connected to a source of power through said switch (11); a first relay actuated with the output from said first delay circuit; a second delay circuit (20) connected to said power source through a first set of contacts of said first relay; a second relay actuated with the output from said second delay circuit; a tape feed means control solenoid and a take-up means control solenoid connected to a second set of contacts of said first relay through the closed contacts of said second relay; and a tape drive means control solenoid connected to said first set of contacts of said first relay through other contacts of said second relay.

* * * * *